(12) United States Patent
Ait-Haddou et al.

(10) Patent No.: US 9,962,662 B2
(45) Date of Patent: May 8, 2018

(54) FLUORINATED POLYMER AND USE THEREOF IN THE PREPARATION OF HYDROPHILIC MEMBRANES (VI)

(71) Applicant: PALL CORPORATION, Port Washington, NY (US)

(72) Inventors: Hassan Ait-Haddou, Melville, NY (US); Frank Onyemauwa, Pace, FL (US)

(73) Assignee: Pall Corporation, Port Washington, NY (US)

( * ) Notice: Subject to any disclaimer, the term of this patent is extended or adjusted under 35 U.S.C. 154(b) by 490 days.

(21) Appl. No.: 14/320,454

(22) Filed: Jun. 30, 2014

(65) Prior Publication Data

US 2015/0375181 A1 Dec. 31, 2015

(51) Int. Cl.
*B01D 71/32* (2006.01)
*B01D 71/66* (2006.01)
*C08G 75/00* (2006.01)
*B01D 67/00* (2006.01)
*C08G 65/14* (2006.01)
(Continued)

(52) U.S. Cl.
CPC ......... *B01D 71/66* (2013.01); *B01D 67/0093* (2013.01); *B01D 71/32* (2013.01); *C08G 65/14* (2013.01); *C08G 65/22* (2013.01); *C08G 65/2636* (2013.01); *C08G 65/2639* (2013.01); *C08G 75/00* (2013.01);
(Continued)

(58) Field of Classification Search
None
See application file for complete search history.

(56) References Cited

U.S. PATENT DOCUMENTS 3,318,959 A 5/1967 Borman
3,470,258 A * 9/1969 Tesoro ............... C08G 65/2639
516/204

(Continued)

FOREIGN PATENT DOCUMENTS

CN 1416944 A 5/2003
CN 103087306 A 5/2013
(Continued)

OTHER PUBLICATIONS

Intellectual Property Office of Singapore, Search Report in Singapore Patent Application No. 10201504820U (dated Apr. 13, 2016).
(Continued)

*Primary Examiner* — Bobby Ramdhanie
*Assistant Examiner* — Michael J An
(74) *Attorney, Agent, or Firm* — Leydig, Voit & Mayer, Ltd.

(57) ABSTRACT

Disclosed is a fluorinated polymer of the formula: R—S—P, wherein R is a fluorocarbyl group, S is sulfur, and P is: (i) polyglycerol; (ii) poly(allyl glycidyl ether); (iii) a copolymer of glycidol and allyl glycidyl ether, the copolymer having one or more allyl groups; or (iv) poly(allyl glycidyl ether) or copolymer of glycidol and allyl glycidyl ether, wherein one more of the allyl groups have been replaced with a functional group as described herein. Also disclosed is a method of preparing the fluorinated polymer. The fluorinated polymer finds use in improving the hydrophilicity of porous hydrophobic membranes such as PTFE and PVDF.

16 Claims, 1 Drawing Sheet

(51) Int. Cl.
  *C08G 65/22* (2006.01)
  *C08G 65/26* (2006.01)
(52) U.S. Cl.
  CPC ...... *B01D 2323/02* (2013.01); *B01D 2325/36* (2013.01); *C08G 2650/54* (2013.01)

(56) References Cited

U.S. PATENT DOCUMENTS

| | | | |
|---|---|---|---|
| 3,498,959 A | 3/1970 | Brode | |
| 3,625,977 A | 12/1971 | Hamb | |
| 3,847,867 A | 11/1974 | Heath et al. | |
| 4,242,384 A | 12/1980 | Andrew et al. | |
| 4,435,330 A | 3/1984 | Falk | |
| 4,485,211 A | 11/1984 | Okamoto | |
| 4,611,048 A | 9/1986 | Peters | |
| 4,698,388 A | 10/1987 | Ohmura et al. | |
| 4,725,441 A | 2/1988 | Porter et al. | |
| 4,948,508 A | 8/1990 | Nakagawa et al. | |
| 4,954,256 A | 9/1990 | Degen et al. | |
| 5,082,565 A | 1/1992 | Haubs et al. | |
| 5,191,026 A | 3/1993 | Nishi et al. | |
| 5,198,554 A | 3/1993 | Inagaki et al. | |
| 5,202,388 A | 4/1993 | Iio et al. | |
| 5,217,627 A * | 6/1993 | Pall | A61J 1/05 210/257.1 |
| 5,282,965 A | 2/1994 | Urairi et al. | |
| 5,286,382 A | 2/1994 | Scarmoutzos et al. | |
| 5,462,867 A | 10/1995 | Azad et al. | |
| 5,580,934 A | 12/1996 | Nishi et al. | |
| 5,599,882 A | 2/1997 | Nishi et al. | |
| 5,726,230 A | 3/1998 | Murata et al. | |
| 5,824,049 A | 10/1998 | Ragheb et al. | |
| 5,911,880 A | 6/1999 | Klein et al. | |
| 5,969,170 A | 10/1999 | Grubbs et al. | |
| 5,976,380 A | 11/1999 | Moya | |
| 5,998,326 A | 12/1999 | Hafner et al. | |
| 6,039,872 A | 3/2000 | Wu et al. | |
| 6,096,020 A | 8/2000 | Hofmann | |
| 6,111,121 A | 8/2000 | Grubbs et al. | |
| 6,126,825 A | 10/2000 | Shinagawa et al. | |
| 6,258,272 B1 | 7/2001 | Wang et al. | |
| 6,354,443 B1 | 3/2002 | Moya | |
| 6,420,503 B1 | 7/2002 | Jayaraman et al. | |
| 6,669,980 B2 | 12/2003 | Hansen | |
| 6,734,386 B1 | 5/2004 | Lauterbach et al. | |
| 6,759,537 B2 | 7/2004 | Grubbs et al. | |
| 6,846,890 B2 | 1/2005 | Miyaki et al. | |
| 6,867,303 B2 | 3/2005 | Grela | |
| 6,921,735 B2 | 7/2005 | Hoveyda et al. | |
| 7,037,993 B2 | 5/2006 | Taguchi et al. | |
| 7,230,066 B2 | 6/2007 | Khouri et al. | |
| 7,284,668 B2 | 10/2007 | Charkoudian | |
| 7,300,022 B2 | 11/2007 | Muller | |
| 7,329,758 B1 | 2/2008 | Grubbs et al. | |
| 7,378,528 B2 | 5/2008 | Herrmann et al. | |
| 7,423,070 B2 | 9/2008 | Larsson et al. | |
| 7,611,629 B2 | 11/2009 | Doucoure et al. | |
| 7,628,917 B2 | 12/2009 | Penezina et al. | |
| 7,717,273 B2 | 5/2010 | Kozlov et al. | |
| 7,750,103 B2 | 7/2010 | Emrick et al. | |
| 8,048,963 B2 | 11/2011 | Fuller et al. | |
| 8,049,025 B2 | 11/2011 | Zhan | |
| 8,053,531 B2 | 11/2011 | Hirata et al. | |
| 8,232,360 B2 | 7/2012 | Sampson et al. | |
| 8,277,914 B2 | 10/2012 | Ogawa et al. | |
| 8,283,410 B2 | 10/2012 | Musa | |
| 8,329,927 B2 | 12/2012 | Tew et al. | |
| 8,420,704 B2 | 4/2013 | Hillmyer et al. | |
| 8,440,765 B2 | 5/2013 | Balsara et al. | |
| 8,535,590 B2 | 9/2013 | Milner et al. | |
| 8,647,730 B2 | 2/2014 | Kudo et al. | |
| 2001/0021764 A1 | 9/2001 | Weisse et al. | |
| 2002/0144944 A1 | 10/2002 | Arcella et al. | |
| 2004/0219350 A1* | 11/2004 | Brown | C07C 41/03 428/323 |
| 2005/0154199 A1 | 7/2005 | Whiteford et al. | |
| 2005/0176893 A1 | 8/2005 | Rana et al. | |
| 2005/0222279 A1 | 10/2005 | Larsson et al. | |
| 2007/0075013 A1 | 4/2007 | Duong et al. | |
| 2007/0238853 A1 | 10/2007 | Hay et al. | |
| 2008/0000201 A1 | 1/2008 | Schorzman et al. | |
| 2009/0127186 A1 | 5/2009 | Mizomoto et al. | |
| 2009/0127197 A1 | 5/2009 | Liu et al. | |
| 2009/0173694 A1 | 7/2009 | Peinemann et al. | |
| 2009/0200239 A1 | 8/2009 | Axen et al. | |
| 2010/0059433 A1* | 3/2010 | Freeman | B01D 67/0093 210/321.6 |
| 2010/0137180 A1 | 6/2010 | Maessen et al. | |
| 2010/0176057 A1* | 7/2010 | Karnik | B01D 61/364 210/640 |
| 2010/0210160 A1* | 8/2010 | Hester | B01D 67/0018 442/59 |
| 2010/0230351 A1* | 9/2010 | Hoving | B01D 69/02 210/650 |
| 2011/0120937 A1 | 5/2011 | Ishizuka et al. | |
| 2011/0206880 A1 | 8/2011 | Wang et al. | |
| 2011/0207841 A1 | 8/2011 | Kosar et al. | |
| 2011/0240550 A1 | 10/2011 | Moore et al. | |
| 2012/0000853 A1* | 1/2012 | Tuteja | B01D 69/02 210/650 |
| 2012/0077893 A1 | 3/2012 | Hood | |
| 2012/0172537 A1 | 7/2012 | Arai et al. | |
| 2013/0041055 A1 | 2/2013 | Hillmyer et al. | |
| 2013/0165661 A1 | 6/2013 | Grubbs et al. | |
| 2013/0280237 A1 | 10/2013 | Tew et al. | |

FOREIGN PATENT DOCUMENTS

| | | |
|---|---|---|
| EP | 0103297 A2 | 3/1984 |
| EP | 0199564 A2 | 10/1985 |
| EP | 0 298 408 A1 | 1/1989 |
| EP | 0 409 291 A2 | 1/1991 |
| EP | 0 430 585 A2 | 6/1991 |
| EP | 0677504 A1 | 10/1995 |
| EP | 0 713 893 A1 | 5/1996 |
| EP | 0 784 066 A1 | 7/1997 |
| EP | 0 811 420 A1 | 12/1997 |
| EP | 1 238 996 A1 | 9/2002 |
| EP | 1 408 064 A1 | 4/2004 |
| EP | 1621573 A1 | 2/2006 |
| EP | 1 769 841 A1 | 4/2007 |
| EP | 1 903 074 A1 | 3/2008 |
| EP | 2 687 285 A1 | 1/2014 |
| JP | S61-204008 A | 9/1986 |
| JP | 2007-269973 A2 | 10/2007 |
| JP | 2009-249500 A2 | 10/2009 |
| JP | 2011-110474 A2 | 6/2011 |
| JP | 2011-122124 A | 6/2011 |
| KR | 2014-0060440 A | 5/2014 |
| WO | WO 97/22406 A1 | 6/1997 |
| WO | WO 00/11058 A1 | 3/2000 |
| WO | WO 00/50161 A1 | 8/2000 |
| WO | WO 01/61042 A2 | 8/2001 |
| WO | WO 02/072659 A1 | 9/2002 |
| WO | WO 2007/018426 A1 | 2/2007 |
| WO | WO 2008/095709 A1 | 8/2008 |
| WO | WO 2009/001724 A1 | 12/2008 |
| WO | WO 2009/013340 A1 | 1/2009 |
| WO | WO 2011/146669 A1 | 11/2011 |
| WO | WO 2012/083253 A1 | 6/2012 |
| WO | WO 2013/097570 A1 | 7/2013 |
| WO | WO 2013/162449 A1 | 10/2013 |

OTHER PUBLICATIONS

Japanese Patent Office, Notice of Reasons for Rejection issued in Japanese Patent Application No. 2015-122991 (dated Aug. 9, 2016).
European Patent Office, Extended European Search Report in European Patent Application No. 15172666.8 (dated Dec. 4, 2015).
Barriau et al., "Linear-Hyperbranched Amphiphilic AB Diblock Copolymers Based on Polystyene and Hyperbranched (56) References Cited

OTHER PUBLICATIONS

Polyglycerol," *Macromolecular Rapid Communications*, vol. 26, pp. 862-867 (2005).
Duncanson et al., "Microfluidic synthesis of monodisperse porous microsphers with size-tunable pores," *Soft Matter*, vol. 8, pp. 10636-10640 (2012).
Karger-Kocsis et al., "Synthesis of reactive hyperbranched and star-like polyethers and their use for toughening of vinylester-urethane hybrid resins," *Polymer*, vol. 45, pp. 1185-1195 (2004).
Killops et al., "Nanopatterning Biomolecules by Block Copolymer Self-Assembly," *MacroLetters*, vol. 1, pp. 758-763 (2012).
Kuhlmann et al., *Macromolecular Rapid Communications*, vol. 33, pp. 1482-1486 (2012).
Liu et al., "Preparation of Star Block Copolymers with Polystyerene-block-Poly(ethylene oxide) as Side Chains on Hyperbranched Polyglycerol Core by Combination of ATRP with Atom Transfer Nitroxide Radical Coupling Reaction," *Journal of Polymer Science Part A: Polymer Chemistry*, vol. 46, pp. 6754-6761 (2008).
Liu et al., "Preparation of Star Polymers of Hyperbranched Polyglycerol Core with Multiarms of PS-b-PtBA and PS-b-PAA," *Journal of Applied Polymer Science*, vol. 108, pp. 777-784 (2008).
Schull et al., "One-step synthesis of multi-alkyne functional hyperbranched polyglycerols by copolymerization of glycidyl propargyl ether and glycidol," *Polymer Chemistry*, vol. 4, pp. 4730-4736 (2013).
Sunder et al., "Copolymers of Glycidol and Glycidyl Ethers: Design of Branched Polyether Polyols by Combination of Latent Cyclic $AB_2$ and ABR Monomers," *Macromolecules*, vol. 33, No. 21, pp. 7682-7692 (2000).
State Intellectual Property Office of the People's Republic of China, Office Action issued in Chinese Patent Application No. 201510528014.5 (dated Jan. 23, 2017) 12 pp.
Korean Intellectual Property Office, Notice of Non-Final Rejection issued in Korean Patent Application No. 10-2015-0089569 (dated Oct. 27, 2016).
Intellectual Property Office of Singapore, Written Opinion issued in Singapore Patent Application No. 10201504820U (dated Oct. 5, 2017) 7 pp.
Adams, Marisa et al., "Investigation of microphase separated dicarboximide-functionalized oxanorbornyl diblock copolymers exhibiting nanostructure," Abstracts of Papers, 247th ACS National Meeting & Exposition, Dallas, TX, United States, Mar. 16-20, 2014.
Asif, A. et al., "Hydroxyl terminated poly(ether ether ketone) with pendant methyl group-toughened epoxy clay ternary nanocomposites: Preparation, morphology, and thermomechanical properties," *Journal of Applied Polymer Science*, vol. 106, No. 5, pp. 2936-2946 (Dec. 5, 2007) (Abstract).
Bang, Joona et al., "Defect-FreeNanoporous Thin Films from ABC Triblock Copolymers," *Journal of the American Chemical Society*, vol. 128, pp. 7622-7629 (2006).
"Spin Coat Theory," Brewer Science, Inc., http://www.brewerscience.com/research/processing-theory/spin-coating-theory, downloaded Jun. 30, 2014 (no original publication or copyright date available).
Francis, Bejoy et al., "Synthesis of hydroxyl-terminated poly(ether ether ketone) with pendent tert-butyl groups and its use as a toughener for epoxy resins," *Journal of Polymer Science Part B: Polymer Physics*, vol. 44, No. 3, pp. 541-556 (Feb. 1, 2006) (Abstract).
Girotto, Claudio et al., "Spray coating for fabricating polymer-based organic solar cells," *Global Solar Technology*, pp. 10-13 (Mar. 2010).
Guillen, Gregory R. et al., "Preparation and Characterization of Membranes Formed by Nonsolvent Induced Phase Separation: A Review," *Industrial & Engineering Chemistry Research*, vol. 50, pp. 3798-3817 (2011).
Hahn et al., "Structure Foimation of Integral-Asymmetric Membrane of Polystyrene-block-Poly(ethylene oxide)," *J. Polym. Sci. B Polym. Phys.*, 51: 281-290 (2013).

Hall, David B. et al., "Spin Coating of Thin and Ultrathin Polymer Films," *Polymer Engineering and Science*, vol. 38, No. 12, pp. 2039-2045 (Dec. 1998).
Hollister, Adrienne et al., "Synthesis and physical properties of dicarboximide-functionalized oxanorbornyl polymers," Abstracts of Papers, 241st ACS National Meeting & Exposition, Anaheim, CA, United States, Mar. 27-31, 2011.
Hollister, Adrienne et al., "Towards novel thin-film polymer blends: Synthesis and characterization of norbornene related homopolymers and diblock copolymers via ring opening metathesis polymerization," Abstracts of Papers, 239th ACS National Meeting, San Francisco, CA, United States, Mar. 21-25, 2010.
Ledoux, Nele, "Ruthenium Olefin Metathesis Catalysts: Tuning of the Ligand Environment," *Universiteit Gent*, pp. 1-198 (2007).
Li, Li, "Nanoporous Polymers for Membrane Applications," Ph.D. Thesis, DTU Chemical Engineering, pp. 1-180 (Jan. 2012).
Love, Jennifer A. et al., "A Practical and Highly Active Ruthenium-Based Catalyst that Effects the Cross Metathesis of Acrylonitrile," *Angewandte Chemie*, vol. 41, No. 21, pp. 4035-4037 (2002).
Lu, Hua et al., "One-Pot Synthesis of Brush-Like Polymers via Integrated Ring-Opening Metathesis Polymerization and Polymerization of Amino Acid N-Carboxyanhydrides," *Journal of the American Chemical Society*, vol. 131, pp. 13582-13583 (2009).
Mulder, M., "Phase Inversion Membranes," *Membrane Preparation: Phase Inversion Membranes*, pp. 3331-3346 (2000).
Oss-Ronen, Liat et al., "Characterization of Block Copolymer Self-Assembly: From Solution to Nanoporous Membranes," *Macromolecules*, vol. 45, pp. 9631-9642 (2012).
Park, Miri et al., "Block Copolymer Lithography: Periodic Arrays of $\sim 10^{11}$ Holes in 1 Square Centimeter," *Science*, vol. 276, pp. 1401-1404 (May 30, 1997).
Peinemann, Klaus-Viktor et al., "Asymmetric superstructure formed in a block copolymer via phase separation," *Nature Materials*, vol. 6, pp. 992-996 (Dec. 2007).
Posselt, Kyle et al., "Synthesis and characterization of dicarboximide-functionalized oxanorbornyl homopolymer and diblock copolymers," Abstracts of Papers, 243rd ACS National Meeting & Exposition, San Diego, CA, United States, Mar. 25-29, 2012.
Richmond, Victoria et al., "Synthesis and characterization of dicarboximide-functionalized oxanorbornyl homopolymers with ethylene oxide side chains," Abstracts of Papers, 247th ACS National Meeting & Exposition, Dallas, TX, United States, Mar. 16-20, 2014.
Riffle, J.S. et al., "Synthesis of hydroxyl-terminated polycarbonates of controlled number-average molecular weight," *Journal of Polymer Science: Polymer Chemistry Edition*, vol. 20, No. 8, pp. 2289-2301 (Aug. 1982) (Abstract).
Sahu, Niranjan et al., "Fundamental understanding and modeling of spin coating process: A review," *Indian Journal of Physics*, vol. 83, No. 4, pp. 493-502 (2009).
Sommer, William, "Olefin Metathesis," Sigma-Aldrich Chemical Co., Inc., *ChemFiles*, vol. 9, No. 6, pp. 3-11 (2009).
Srinivasan, Siddarth et al., "Solution Spraying of Poly(methyl methacrylate) Blends to Fabricate Micro-textured, Superoleophobic Surfaces," Manuscript (downloaded May 19, 2014).
Thurn-Albrecht, Thomas et al., "Nanoscopic Templates from Oriented Block Copolymer Films," *Advanced Materials*, vol. 12, No. 11, pp. 787-791 (2000).
Walheim, Stefan et al, "Structure Formation via Polymer Demixing in Spin-Cast Films," *Macromolecules*, vol. 30, pp. 4995-5003 (1997).
"Polyester ether ketone (PEEK)," Wikipedia, http://en.wikipedia.org/wiki/PEEK, downloaded Jun. 11, 2014.
Yang, Yong-qiang et al., "Preparation of PPESK Hollow Fiber Asymmetric Nanofiltration Membrane," *The Proceedings of the 3rd International Conference on Functional Molecules*, pp. 295-296 (May/Jun. 2011).
Yun, Yanbin et al, "Preparation of an Ultrafiltration Membrane from Poly(Phthalazine Ether Sulfone Ketone)," *Integrated Concepts in Water Recycling*, pp. 741-752 (2005).

(56) References Cited

OTHER PUBLICATIONS

Zhang, Yanfeng et al., "PEG-Polypeptide Dual Brush Block Copolymers: Synthesis and Application in Nanoparticle Surface PEGylation," *ACS Macro Letters*, vol. 2, pp. 809-813 (2013).
State Intellectual Property Office of the People's Republic of China, Second Office Action issued in Chinese Patent Application No. 201510528014.5 (dated Sep. 11, 2017) 6 pp.

* cited by examiner

FLUORINATED POLYMER AND USE THEREOF IN THE PREPARATION OF HYDROPHILIC MEMBRANES (VI)

BACKGROUND OF THE INVENTION

Hydrophobic polymers, in particular fluoropolymers, have been used for preparing porous membranes, for example, microfiltration membranes or ultrafiltration membranes, in view of their desirable bulk properties such as mechanical flexibility, thermal stability, and chemical resistance. However, when used to filter water based fluids, the surfaces of such membranes need improvement in terms of hydrophilicity, wettability, and/or low protein adsorption.

Attempts have been made to improve the one or more of the above properties of fluoropolymer membranes. For example, high energy irradiation, sputtering, and plasma treatments have been employed to improve the hydrophilicity of fluoropolymer membrane surfaces. However, such attempts have produced membranes with insufficient improvement in hydrophilicity, or when they have sufficiently improved hydrophilicity, the membrane surfaces have been modified to such an extent that the solute rejection performance has been significantly degraded from the original membrane performance.

The foregoing shows that there exists an unmet need for a method of improving the hydrophilicity of fluoropolymer membranes without significantly affecting their performance characteristics.

BRIEF SUMMARY OF THE INVENTION

The present invention provides a facile method for improving the hydrophilicity of fluoropolymer membranes without significantly affecting their performance characteristics.

Thus, the invention provides a fluorinated polymer of the formula: R—S—P, wherein R is a fluorocarbyl group, S is sulfur, and P is: (i) polyglycerol; (ii) poly(allyl glycidyl ether); (iii) a copolymer of glycidol and allyl glycidyl ether, said copolymer having one or more allyl groups; or (iv) poly(allyl glycidyl ether) or copolymer of glycidol and allyl glycidyl ether, wherein one more of the allyl groups have been replaced with 1,2-dihydroxypropyl group or a group of the formula: —$(CH_2)_a$—S—$(CH_2)_b$—X, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula —C(H)(COOH)($NH_2$), and a group of the formula —C(H)(COOH)(NHAc), or a salt thereof.

The fluorinated polymer of the invention can be used to improve the hydrophilicity of hydrophobic membrane surfaces such as hydrophobic fluoropolymer membranes. The fluorinated polymer adheres strongly to hydrophobic surfaces of membranes through van der Waals forces, and provides membranes with increased surface tension, with critical wetting surface tension (CWST) values as high as 95 dynes/cm or more. The surface modification is stable to treatment with harsh chemicals such as acid, alkali, or bleach. The hydrophilic membranes resist dewetting. The hydrophilic membranes have a low protein binding capacity.

DETAILED DESCRIPTION OF THE INVENTION

In accordance with an embodiment, the invention provides a fluorinated polymer of the formula: R—S—P, wherein R is a fluorocarbyl group, S is sulfur, and P is: (i) polyglycerol; (ii) poly(allyl glycidyl ether); (iii) a copolymer of glycidol and allyl glycidyl ether, said copolymer having one or more allyl groups; or (iv) poly(allyl glycidyl ether) or copolymer of glycidol and allyl glycidyl ether, wherein one more of the allyl groups have been replaced with 1,2-dihydroxypropyl group or a group of the formula: —$(CH_2)_a$—S—$(CH_2)_b$—X, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula —C(H)(COOH)($NH_2$), and a group of the formula —C(H)(COOH)(NHAc), or a salt thereof.

In accordance with an embodiment, R can be any suitable fluorocarbyl group, for example, a fluoroalkyl group, a fluoroalkenyl group, or a fluorocycloalkyl group. The fluoroalkyl or fluoroalkenyl group can be linear or branched.

In an embodiment, the fluorocarbyl group is a fluoroalkyl group of the formula: $C_nF_{2n+1}(CH_2)_m$—, wherein n and m are independently 1 to 20, preferably n is 4 to 12 and m is 2 to 6, and more preferably n is 8 and m is 2.

In embodiments, n is 1, 2, 3, 4, 5, 6, 7, 8, 9, 10, 11, 12, 13, 14, 15, 16, 17, 18, 19, or 20.

In any of the above embodiments, m is 1, 2, 3, 4, 5, or 6.

In accordance with any of the embodiments above, P is polyglycerol or a polymer of glycidol. In accordance with an embodiment, the polyglycerol has one or more of the following repeat units:

In accordance with any of the embodiments above, the polyglycerol comprises of one or more of the following structures, the point of attachment to the sulfur of R—S—P being indicated by the squiggly line below:

In accordance with an embodiment, P is a copolymer of glycidol and allyl glycidyl ether, said copolymer having one or more allyl groups. For example, P, the copolymer comprises the following structure:

In accordance with an embodiment, P is a polymer of allyl glycidyl ether where the allyl group has been replaced with a functional group. For example, P has one of the following structures:

wherein m is about 10 to about 1000, preferably from about 30 to about 300, and more preferably from about 50 to about 250.

In accordance with an embodiment, P is a copolymer of glycidol and allyl glycidyl ether, where one or more of the allyl groups have been replaced with a functional group. Thus, for example, P is of the formula:

wherein R is allyl and/or —(CH$_2$)$_b$—X.

In an embodiment of the block copolymer, X is selected from amino, dimethylamino, —CH$_2$CH$_2$SO$_3$H, —CH$_2$CH$_2$CH$_2$SO$_3$H, —CH$_2$CO$_2$H, and —CH$_2$CH$_2$N$^+$(CH$_3$)$_3$, and combinations thereof.

Thus, for example, P has one of the following structures:

-continued

In accordance with an embodiment, the fluorinated polymer has the following structure:

PG-PFDT

In accordance with an embodiment, the fluorinated polymer has the following structure:

PFDT-PG-AGE

The present invention further provides a method of preparing a fluorinated polymer of the formula: R—S—P, wherein R is a fluorocarbyl group, S is sulfur, and P is: (i) polyglycerol; (ii) poly(allyl glycidyl ether); (iii) a copolymer of glycidol and allyl glycidyl ether, said copolymer having one or more allyl groups; or (iv) poly(allyl glycidyl ether) or copolymer of glycidol and allyl glycidyl ether, wherein one more of the allyl groups have been replaced with 1,2-dihydroxypropyl group or a group of the formula: —$(CH_2)_a$—S—$(CH_2)_b$—X, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula —C(H)(COOH)($NH_2$), and a group of the formula —C(H)(COOH)(NHAc), or a salt thereof; the method comprising: (i) providing a fluorocarbyl thiol; (ii) carrying out a ring opening polymerization of glycidol, allyl glycidyl ether, or a mixture of glycidol and allyl glycidyl ether on the fluorocarbyl thiol; and/or (iii) replacing one more of the allyl groups with 1,2-dihydroxypropyl group or a group of the formula: —$(CH_2)_a$—S—$(CH_2)_b$—X, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula —C(H)(COOH)($NH_2$), and a group of the formula —C(H)(COOH)(NHAc), or a salt thereof.

Any suitable fluorocarbyl thiol can be used to initiate the ring opening polymerization. Examples of suitable fluorocarbyl thiols include fluoroalkyl thiols, such as $C_nF_{2n+1}(CH_2)_mSH$, wherein n and m are independently 1 to 20, preferably n is 4 to 12 and m is 2 to 6, and more preferably n is 8 and m is 2.

In embodiments, n is 1, 2, 3, 4, 5, 6, 7, 8, 9, 10, 11, 12, 13, 14, 15, 16, 17, 18, 19, or 20.

In any of the above embodiments, m is 1, 2, 3, 4, 5, or 6.

Glycidol or 2,3-epoxy-1-propanol contains one epoxide ring and one hydroxyl group as functional end groups. Both ends are capable of reacting with each other to form macromolecules which are glycerol derivatives. The resulting macromolecules continue to react to form polyglycerol. Allyl glycidyl ether contains one epoxide ring, which is capable of undergoing ring opening polymerization.

The opening of the epoxide ring in glycidol and/or allyl glycidyl ether is initiated by the thiol group of the fluorocarbyl thiol. The ring opened epoxide continues to open the epoxide of the next glycidol and/or allyl glycidyl ether, and the polymerization of glycidol and allyl glycidyl ether proceeds in this manner.

In accordance with an embodiment, the ring opening polymerization is carried out in the absence of a solvent.

Alternatively, the ring opening polymerization can be carried in a suitable solvent, particularly a polar aprotic solvent. Examples of suitable solvents include N,N-dimethylacetamide, N,N-dimethylformamide, dimethyl sulfoxide, N-methylpyrrolidone, tetrahydrofuran, dioxane, and anisole, and mixtures thereof. The amount of the fluorocarbyl thiol, glycidol, and/or allyl glycidyl ether can be present at any suitable concentration, for example, each can be present at a concentration of about 5% to about 60% or more, preferably about 10% to about 50%, and more preferably about 20% to about 40%, by weight of the polymerization medium. In an embodiment, the concentration of each is about 30% by weight.

Optionally, the ring opening reaction by the thiol can be carried out in the presence of a base.

In an embodiment, the ring opening polymerization is conducted such that the ratio of the thiol to glycidol is from about 1:1 to about 1:1000, preferably from about 1:1 to about 1:100, and more preferably from about 1:1 to about 1:50.

In an embodiment, the ring opening polymerization is conducted such that the ratio of the thiol to allyl glycidyl ether in the reaction mixture is from about 1:1 to about 1:1000, preferably from about 1:1 to about 1:100, and more preferably from about 1:1 to about 1:50.

In an embodiment, the ring opening polymerization is conducted such that the ratio of the thiol, glycidol, and allyl glycidyl ether in the reaction mixture is from about 1:1:1 to about 1:1000:1000, preferably from about 1:1:1 to about 1:100:100, and more preferably from about 1:1:1 to about 1:50:50.

The ring opening polymerization is conducted at a suitable temperature, for example, from 25° C. to about 130° C., preferably about 50° C. to about 120° C., and more preferably about 60° C. to about 80° C.

The polymerization can be carried out for any suitable length of time, for example, about 1 hr to about 100 hrs, preferably about 2 hrs to about 40 hrs, more preferably about 3 to about 20 hrs. The polymerization time can vary depending on, among others, the degree of polymerization desired and the temperature of the reaction mixture.

If a solvent is used for polymerization, the resulting fluorinated polymer can be isolated from the reaction mixture by precipitation with a nonsolvent, e.g., water. The resulting polymer is dried to remove any residual solvent or nonsolvent.

In the above fluorinated polymer, one or more of the allyl groups of the copolymer can be replaced with 1,2-dihydroxypropyl group or a group of the formula: —$(CH_2)_a$—S—$(CH_2)_b$—X, wherein a is 3 and b is 1 to 3, and X is a group selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula —C(H)(COOH)(NH$_2$), and a group of the formula —C(H)(COOH)(NHAc), or a salt thereof, by reacting the block copolymer with an agent selected from an oxidizing agent, a carboxyl alkane thiol or a salt thereof, a sulfonic alkane thiol or a salt thereof, a (dialkylamino)alkane thiol or a salt thereof, a haloalkane thiol, hydroxyalkane thiol, an acyl alkane thiol, an alkoxy alkane thiol, an alkylthio alkane thiol, an aldehydo alkane thiol, an amidoalkane thiol, a carbamoyl alkane thiol, an ureido alkane thiol, a cyanoalkane thiol, a nitro alkane thiol, an epoxy alkane thiol, cysteine, an acyl cysteine, an aminoalkane thiol or a salt thereof, an alkylamino alkane thiol, a dialkylaminoalkane thiol, and a sulfonic alkylammonium alkane thiol or a salt thereof.

In accordance with an embodiment, X can be any acidic group, for example, sulfonic acid, phosphoric acid, phosphonic acid, or carboxylic acid, the basic group can be any basic group, for example, an amino group, an alkylamino group, or a dialkylamino group, the cation can be any cationic group, for example, a quaternary ammonium group, and the zwitterion can be, for example, a quaternary ammonium alkyl sulfonate group of the formula —$N^+(R^1R^2)$$(CH_2)_c SO_3^-$, wherein $R^1$ and $R^2$ are alkyl groups and c is 1 to 3.

One or more of the allyl groups can be reacted with a suitable agent to effect the desired changes. For example, the allyl group can be converted to 1,2-dihydroxypropyl groups by reacting with an oxidizing agent such as osmium tetroxide, alkaline permanganate, or hydrogen peroxide.

The allyl group can be converted to a group of the formula: —$(CH_2)_a$—S—$(CH_2)_b$—X, wherein a is 3 and b is 1 to 3, and X is an acidic group by reacting the allyl group with an acid group bearing thiol such as HS—$(CH_2)_b$—X, wherein X is COOH, PO$_4$H, PO$_3$H, or SO$_3$H, wherein b is 1 to 3.

The allyl group can be converted to a group of the formula: —$(CH_2)_a$—S—$(CH_2)_b$—X, wherein a is 3 and b is 1 to 3, and X is a basic group by reacting the allyl group with a basic group bearing thiol such as HS—$(CH_2)_b$—X, wherein X is NH$_2$, NHR, or NRR, where R is a $C_1$-$C_6$ alkyl group, and b is 1 to 3.

The allyl group can be converted to a group of the formula: —$(CH_2)_a$—S—$(CH_2)_b$—X, wherein a is 3 and b is 1 to 3, and X is a cationic group by reacting the allyl group with a cationic group bearing thiol such as HS—$(CH_2)_b$—X, wherein X is NH$_3^+$, NHRR$^+$, or NRRR$^+$, where R is a $C_1$-$C_6$ alkyl group, and b is 1 to 3.

The allyl group can be converted to a group of the formula: —$(CH_2)_a$—S—$(CH_2)_b$—X, wherein a is 3 and b is 1 to 3, and X is a zwitterionic group by reacting the allyl group with a zwitterionic group bearing thiol such as HS—$(CH_2)_b$—X, wherein X is group bearing a zwitterion, for example, —$N^+(R)_2$—$(CH_2)_c$—SO$_3^-$, where R is a $C_1$-$C_6$ alkyl group, and b and c are independently 1 to 3.

One or more of the allyl groups can be replaced by reacting with a haloalkane thiol, for example, with a fluoroalkane thiol, a chloroalkane thiol, a bromoalkane thiol, or an iodoalkane thiol. The acyl group of acyl alkane thiol can be formyl, acetyl, propionyl, or butanoyl. The alkoxy part of alkoxy alkane thiol can be a $C_1$-$C_6$ alkoxy group. The alkylthio part of alkylthio alkane thiol can be a $C_1$-$C_6$ alkyl group.

In an embodiment, one or more of the allyl groups can be reacted with a carboxylic alkane thiol or a salt thereof, a phosphoric alkane thiol or a salt thereof, a phosphonic alkane thiol or a salt thereof, a sulfonic alkane thiol or a salt thereof, a (dialkylamino)alkane thiol or a salt thereof, an aminoalkane thiol or a salt thereof, an alkylamino alkane thiol, a dialkylaminoalkane thiol, and a sulfonic alkylammonium alkane thiol or a salt thereof.

The present invention further provides a method of increasing the hydrophilicity of a hydrophobic polymer membrane comprising coating the hydrophobic membrane with a fluorinated polymer as described above.

In accordance with an embodiment, the hydrophobic polymer membrane comprises a fluoropolymer, i.e., a polymer comprising fluorine, for example, a polymer selected from polytetrafluoroethylene, poly(vinylidene fluoride), copolymers of vinylidene fluoride, poly(chlorotrifluoroethylene), poly(fluoroethylene-propylene), poly(ethylene-chlorotrifluorethylene), poly(tetrafluoroethylene-co-hexafluoropropylene), pol(ethylene-tetrafluoroethylene), poly(tetrafluoroethylene-co-perfluoroalkylvinyl ether), perfluoroalkoxy polymer, perfluoropolyether, polyvinylfluoride, and fluorinated ethylene-propylene, preferably polytetrafluoroethylene or poly(vinylidene fluoride).

A fluorinated polymer of the invention is dissolved in a suitable solvent and applied as a coating on a fluoropolymer membrane. The solvent can be selected from water, alcohol solvents, e.g., methanol, ethanol, or isopropanol, ester solvents, e.g., ethyl acetate, propyl acetate, ethyl formate, propyl formate, and amyl acetate, ketone solvents, e.g., acetone, methyl ethyl ketone, and cyclohexanone, amide solvents, e.g., N,N-dimethylformamide, N,N-dimethylacetamide, and N-methylpyrrolidone, cyclic ethers, e.g., dioxane and dioxolane, and mixtures thereof. In an embodiment, the solvent is a mixture of methanol and water at a ratio of 50:50 v/v.

The fluorinated polymer can be present in the solution at a suitable concentration, for example, from about 0.01% to about 5%, preferably from about 0.1% to about 2%, and more preferably from about 0.25% to about 1% by weight.

Prior to coating, the fluoropolymer membrane can be optionally pre-wet with isopropanol, ethanol or methanol and rinsed with water.

The fluoropolymer membrane is contacted with the coating solution for a suitable length of time, for example, from about 1 minute to about 2 hours or more, preferably from about 10 minutes to about 1 hour, and more preferably from about 20 minutes to about 50 minutes.

The contacting of the fluoropolymer membrane with the coating solution can be carried out in any suitable manner, for example, by immersing the membrane into the coating solution, by passing the coating solution through the membrane with or without vacuum applied across the membrane, by meniscus coating, by dip coating, by spray coating, or by spin coating, or any combination thereof.

The coated membrane is heated to a temperature of about 40° C. or higher, for example, to about 60° C. to about 160° C., preferably from about 70° C. to about 115° C., and more preferably from about 80° C. to about 110° C.

The above heating can be carried out for a suitable period of time, for example, for about 1 minute to about 2 hours, preferably for about 10 minutes to about 1 hour, and more preferably for about 20 minutes to about 40 minutes.

The coated membrane is optionally washed in hot water, for example, at about 80° C., for a suitable period of time to remove any free fluorinated polymer or water soluble polymer, for example, for a period of about 5 minutes to 2 hours, following which the coated membrane is dried at a suitable temperature, for example, at about 80° C. to about 110° C., for a period of from about 2 minutes to about 20 minutes.

The resulting hydrophilic fluoropolymer membrane has a CWST of greater than 72 dynes/cm, for example, 73, 75, 80, 85, 90, or 95 dynes/cm.

The porous membranes of the invention are stable to exposure to a solution containing 2% NaOH and 2000 ppm of NaOCl at least for 7 days, in 5M NaOH at least for 7 days, or in 5M HCl at least for 7 days, at room temperature. In embodiments, the membranes are stable to such exposures up to 30 days at room temperature.

The porous membranes of the invention resist fouling. For example, when tested with a surface water, the porous hollow fiber membranes exhibit high permeate flow rates, e.g., at least 7.0 mL/min/cm$^2$, and high permeate flow rates are maintained over repeated cycles, for example, 5 cycles or more.

Porous membranes according to embodiments of the invention find use in as microfiltration or ultrafiltration membranes or in the preparation of nanofiltration membranes, reverse osmosis membranes, gas separation membranes, pervaporation or vapor permeation membranes, dialysis membranes, membrane distillation, chromatography membranes, and/or forward osmosis membranes and pressure retarded osmosis membranes.

Porous membranes according to embodiments of the invention have a pore size of about 0.005 µm or greater, for example, from about 0.02 µm to about 10 µm, preferably from about 0.03 µm to about 0.5 µm, and more preferably from about 0.01 µm to about 0.2 µm.

Porous membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Porous membranes according to embodiments of the invention can be used in a variety of devices, including surgical devices and products, such as, for example, ophthalmic surgical products. Porous membranes according to embodiments of the invention can also be used for water purification, such as, for example, purification of surface, ground, or industrial water.

In accordance with embodiments of the invention, the porous membrane can have a variety of configurations, including planar, flat sheet, pleated, tubular, spiral, and hollow fiber.

Porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The following examples further illustrate the invention but, of course, should not be construed as in any way limiting its scope.

EXAMPLE 1

This example illustrates the preparation of a fluorinated polymer in accordance with an embodiment of the invention, wherein perfluorodecanethiol was conjugated with polyglycerol to produce a PG-PFDT.

2 g of perfluorodecanethiol was mixed with 2 g of glycidol, and the reaction mixture was stirred at 60° C. for 6 hours. The resulting white solid waxy material was dried in a vacuum oven overnight at 40° C. Elemental analysis revealed that the product, PG-PFDT, contained 3% sulfur and approximately 30% fluorine.

EXAMPLE 2

This example illustrates the preparation of another fluorinated polymer in accordance with an embodiment of the invention, wherein perfluorodecanethiol was conjugated with polyglycerol to produce a PG-PFDT.

Perfluorodecanethiol (5 g) was mixed with glycidol (7.5 g) and potassium carbonate (0.2 g), and the reaction mixture was stirred at 60° C. for 6 hours. The resulting white waxy solid was dried in a vacuum oven overnight at 60° C. Elemental analysis revealed that the product, PG-PFDT, contained 1.7% sulfur and 20% of fluorine.

EXAMPLE 3

This example illustrates the preparation of another fluorinated polymer in accordance with an embodiment of the invention, wherein perfluorodecanethiol was conjugated with polyglycerol to produce a PG-PFDT.

Perfluorodecanethiol (5 g) was mixed with glycidol (10 g) and potassium carbonate (0.2 g), and the reaction mixture was stirred at 60° C. for 6 hours. The resulting white waxy solid was dried in a vacuum oven overnight at 60° C. Elemental analysis revealed that the product, PG-PFDT, contained 1.2% sulfur and 12% of fluorine.

EXAMPLE 4

This example illustrates the preparation of another fluorinated polymer in accordance with an embodiment of the invention, wherein perfluorodecanethiol was conjugated with polymerized glycidol and allyl glycidyl ether to produce a PFDT-PG-AGE.

Perfluorodecanethiol (3 g) was mixed with glycidol (2 g) and allyl glycidyl ether (5 g) and potassium carbonate (0.12 g). The reaction mixture was stirred at 80° C. for 20 hours. Excess glycidol and allyl glycidyl ether were evaporated under vacuum overnight at 60° C. Proton NMR confirmed the presence of 60 mol % of allyl groups.

EXAMPLE 5

This example illustrates the preparation of another fluorinated polymer in accordance with an embodiment of the invention, wherein perfluorodecanethiol was conjugated with polymerized glycidol and allyl glycidyl ether to produce a PFDT-PG-AGE.

Perfluorodecanethiol (5 g) was mixed with glycidol (1 g), allylglycidyl ether (4 g), and potassium carbonate (0.2 g), and the reaction mixture was stirred at 100° C. for 12 hours. THF (200 mL) was added to the reaction mixture and the solution was extracted with DI water (2×100 mL). The THF solution was concentrated under vacuum at 60° C. overnight to obtain 8 g of the desired product as a viscous liquid. Proton NMR analysis confirmed the presence of 50 mol % of allyl groups.

EXAMPLE 6

This example illustrates the preparation of another fluorinated polymer in accordance with an embodiment of the invention, wherein perfluorodecanethiol was conjugated with polymerized glycidol and allyl glycidyl ether to produce PFDT-PG-AGE.

Perfluorodecanethiol (5 g) was mixed with glycidol (2 g) and allylglycidyl ether (10 g), and potassium carbonate (0.2 g). The reaction mixture was stirred at 100° C. for 20 hours. The resulting white viscous material was dried in a vacuum oven overnight at 60° C. Proton NMR confirmed the presence of 70 mol % of allyl groups.

EXAMPLE 7

This example illustrates the preparation of hydrophilic PTFE and PVDF membranes in accordance with an embodiment of the invention.

A 0.25%, 0.5%, or 1.0% solution by weight of PG-PFDT (Example 1) or PFDT-PG-AGE (Example 4) was prepared in water/methanol solvent mixture at 50/50 volume ratio. Hydrophobic flat sheet PTFE and PVDF membranes (pore size 0.02 mm to 0.2 µm), and hollow fiber membranes made of PTFE (pore size 0.1 µm to 0.2 µm) with a CWST of 25 dynes/cm) and PVDF (pore size 0.02 µm to 0.5 µm) with a CWST of 34-36 dynes/cm were first pre-wet with isopropanol and rinsed with water, following which the membranes were soaked in the solutions of PG-PFDT or PFDT-PG-AGE for 30 minutes.

The membranes were cured at 100° C. for 30 minutes. The cured membranes were leached in hot water at 80° C. for one hour, and dried at 100° C. for 10 minutes to obtain hydrophilic PTFE and PVDF membranes.

EXAMPLE 8

This example illustrates that the hydrophilic PTFE and PVDF membranes prepared in accordance with an embodiment of the invention are stable to leaching treatments in acid, alkali, and alkaline hypochlorite solutions.

The PTFE and PVDF membranes prepared in Example 7 were soaked in a solution containing 2% NaOH and 2000 ppm of NaOCl for 7 days, in 5M NaOH for 7 days, or in 5M HCl for 7 days, all at 80° C. The membranes were washed with water and dried for 10 minutes at 100° C. Surface tension measurements indicated that there was no change in surface tension after these treatments.

An SV4 membrane (virus removal membrane from Pall Corp) had a CWST of 73 dynes/cm when treated with 0.5% solution of PG-PFDT. After heating at 100° C. for 8 hours, the CWST remained at 73 dynes/cm. The SV4 membrane had a CWST of 81 dynes/cm when treated with 0.5% solution of PFDT-PG-AGE. After heating at 100° C. for 8 hours, the CWST remained at 81 dynes/cm.

EXAMPLE 9

This example illustrates some of the properties of the hydrophilic PTFE and PVDF membranes prepared in accordance with an embodiment of the invention.

The CWST values of the hydrophilic PTFE and PVDF membranes illustrated in Example 8 after the leaching treatments are set forth in Table 1.

TABLE 1

CWST of Fluoropolymer Membranes

| Conjugate Polymer | Instant CWST (dynes/cm) on PTFE flat sheet | Instant CWST (dynes/cm) on PVDF flat sheet | Instant CWST (dynes/cm) on PTFE hollow fiber | Instant CWST (dynes/cm) on PVDF hollowfiber |
|---|---|---|---|---|
| PFDT-PG-AGE | 105 | 105 | 95 | 105 (outside) |
| PG-PFDT | 90 | 73-81 | 81 | 81 (outside) |

EXAMPLE 10

This example illustrates the ability of hydrophilic membranes prepared in accordance with an embodiment of the invention to resist fouling.

Figure 1:
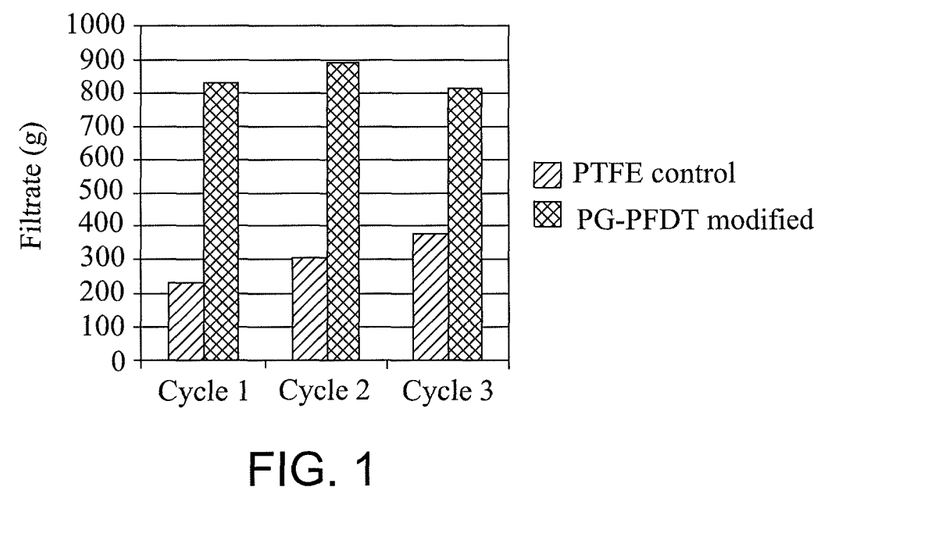
FIG. 1 depicts the permeate filtrate in grams as a function of the number of cycles when a hydrophilic fluoropolymer membrane in accordance with an embodiment of the invention was tested with surface water.
Figure 2:
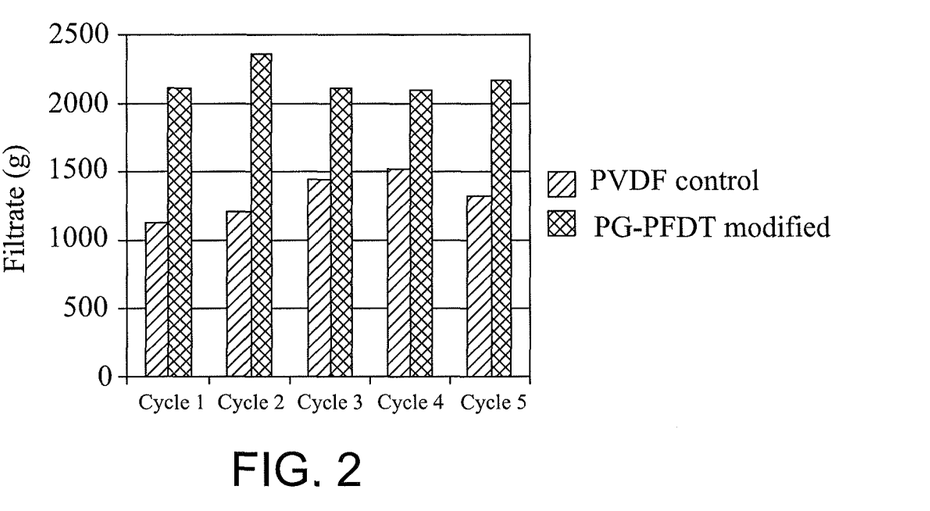
FIG. 2 depicts the permeate filtrate in grams as a function of the number of cycles when another hydrophilic fluoropolymer membrane in accordance with an embodiment of the invention was tested with surface water.

A PTFE membrane and a PVDF membrane modified by a 0.5% solution of PG-PFDT as illustrated in Example 7 were tested with a surface water, which was a lake water with the following characterization: pH 6.25, conductivity 25.5 mS/cm, total dissolved solids 32 mg/L, and total organic carbon 6.9 mg/L, over a number of filtration cycles. As can be seen from FIG. 1-2, the membranes of the invention resisted fouling as indicated by the higher permeation rates maintained compared to those of the control membranes, over the filtration cycles.

EXAMPLE 11

This example illustrates the ability of hydrophilic membranes prepared in accordance with an embodiment of the invention to resist protein binding.

PTFE and PVDF membranes prepared as in Example 7 with 0.5% solution of the PG-PFDT or the PFDT-PG-AGE were tested for protein binding in a static soak test, known as the Micro BCA™ test. The amount of bound protein, bovine serum albumin, was measured. The results obtained are set forth in Table 2.

TABLE 2

Protein Binding Data

| Membrane | BSA bound ($\mu g/cm^2$) |
|---|---|
| 0.2 μm PTFE control | 11.2 |
| PFDT-PG-AGE on 0.2 μm PTFE | 0 |
| PG-PFDT on 0.2 μm PTFE | 0 |
| 0.2 μm PVDF control | 25.4 |
| PFDT-PG-AGE on 0.2 μm PVDF | 0.3 |
| 0.02 μm SV4 PVDF control | 1.43 |
| PG-PFDT on 0.02 μm SV4 PVDF | 0.5 |

EXAMPLE 12

This example illustrates that the surface modification in accordance with an embodiment of the invention does not significantly reduce water flux.

PTFE and PVDF membranes prepared as in Example 7, by the use of 0.5% solution of the PG-PFDT, were tested for water permeation, and the results obtained are set forth in Table 3.

TABLE 3

Water Flow Rates of Membranes

| Membrane | Water Flow Rate ($mL/min/cm^2$) at 24 psi |
|---|---|
| 0.1 μm PVDF control | 8.2 |
| PFDT-PG-AGE on 0.1 μm PVDF | 7.8 |
| 0.2 μm PVDF control | 14.8 |
| 0.5% PFDT-PG-AGE on 0.2 μm PVDF | 13.5 |
| 1% PG-PFDT on 0.2 μm PVDF | 15.8 |
| 0.2 μm PTFE control | 30 (after pre-wet with IPA) |
| 0.5% PFDT-PG-AGE on 0.2 μm PTFE | 10.1 |
| 0.5% PG-PFDT on 0.2 μm PTFE | 5.9 |
| 0.02 μm SV4 PVDF control | 4.25 (cc/min/psi/sq.ft.) |
| 0.5% PG-PFDT on 0.02 μm SV4 | 2.9 (cc/min/psi/sq.ft.) |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fluorinated polymer of the formula: R—S—P, wherein R is a fluorocarbyl group, S is sulfur, and P is: (i) a copolymer of glycidol and allyl glycidyl ether, said copolymer having one or more allyl groups or (ii) poly(allyl glycidyl ether) or copolymer of glycidol and allyl glycidyl ether, wherein one more of the allyl groups have been replaced with 1,2-dihydroxypropyl group or a group of the formula: —(CH$_2$)$_a$—S—(CH$_2$)$_b$—X, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula—C(H)(COOH)(NH$_2$), and a group of the formula—C(H)(COOH)(NHAc), or a salt thereof; wherein
   the fluorinated polymer is hydrophilic such that when it is coated on a hydrophobic porous support shows a critical wetting surface tension greater than 72 dynes/cm.

2. The fluorinated polymer of claim 1, where R is a fluorocarbyl group of the formula: C$_n$F$_{2n+1}$ (CH$_2$)$_m$—, wherein n and m are independently 1 to 20.

3. The fluorinated polymer of claim 2, wherein n is 4 to 12 and m is 2 to 6.

4. The fluorinated polymer of claim 2, wherein n is 8 and m is 2.

5. The fluorinated polymer of claim 1, wherein the fluorocarbyl group is linear.

6. The fluorinated polymer of claim 1, wherein P is a copolymer of glycidol and allyl glycidyl ether, said copolymer having one or more allyl groups.

7. The fluorinated polymer of claim 6, wherein the copolymer comprises the following structure:

8. The fluorinated polymer of claim 1, wherein P is a copolymer of glycidol and allyl glycidyl ether, said copolymer having one or more allyl groups, and the fluorinated polymer has the following structure:

PFDT-PG-AGE

9. A method of preparing a fluorinated polymer of the formula: R—S—P, wherein R is a fluorocarbyl group, S is sulfur, and P is: (i) a copolymer of glycidol and allyl glycidyl ether, said copolymer having one or more allyl groups or (ii) copolymer of glycidol and allyl glycidyl ether, wherein one more of the allyl groups have been replaced with 1,2-dihydroxypropyl group or a group of the formula: —(CH$_2$)$_a$—S—(CH$_2$)$_b$—X, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula —C(H)(COOH)(NH$_2$), and a group of the formula —C(H)(COOH)(NHAc), or a salt thereof; the method comprising:
(i) providing a fluorocarbyl thiol; and
(ii) carrying out a ring opening polymerization of a mixture of glycidol and allylglycidyl ether on the fluorocarbyl thiol to obtain the fluorinated polymer where P is a copolymer of glycidol and allyl glycidyl ether, said copolymer having one or more allyl groups, and optionally
(iii) replacing one more of the allyl groups with 1,2-dihydroxypropyl group or a group of the formula: —(CH$_2$)$_a$—S—(CH$_2$)$_b$—X, wherein a is 3 and b is 1 to 3, and X is selected from an acidic group, a basic group, a cation, an anion, a zwitterion, halo, hydroxyl, acyl, acyloxy, alkylthio, alkoxy, aldehydo, amido, carbamoyl, ureido, cyano, nitro, epoxy, a group of the formula —C(H)(COOH)(NH$_2$), and a group of the formula —C(H)(COOH)(NHAc), or a salt thereof; wherein
the fluorinated polymer is hydrophilic such that when it is coated on a hydrophobic porous support shows a critical wetting surface tension greater than 72 dynes/cm.

10. A method of increasing the hydrophilicity of a hydrophobic polymer membrane comprising coating the hydrophobic membrane with a fluorinated polymer according to claim 1.

11. The method of claim 10, wherein the hydrophobic polymer membrane comprises a polymer selected from polytetrafluoroethylene, poly(vinylidene fluoride), copolymers of vinylidene fluoride, poly(chlorotrifluoroethylene), poly(fluoroethylene-propylene), poly(ethylene-chlorotrifluorethylene), poly(tetrafluoroethylene-co-hexafluoropropylene), pol(ethylene-tetrafluoroethylene), poly(tetrafluoroethylene-co-perfluoroalkylvinyl ether), perfluoroalkoxy polymer, perfluoropolyether, polyvinylfluoride, and fluorinated ethylene-propylene.

12. The method of claim 10, wherein hydrophobic polymer membrane comprises polytetrafluoroethylene or poly(vinylidene fluoride).

13. A hydrophilic fluoropolymer membrane comprising a coating of a fluorinated polymer according to claim 1 disposed on a hydrophobic fluoropolymer membrane.

14. The hydrophilic fluoropolymer membrane according to claim 13, having a critical wetting surface tension greater than 72 dynes/cm.

15. A method of increasing the hydrophilicity of a hydrophobic polymer membrane comprising coating the hydrophobic membrane with a fluorinated polymer according to claim 8.

16. A hydrophilic fluoropolymer membrane comprising a coating of a fluorinated polymer according to claim 8 disposed on a hydrophobic fluoropolymer membrane.

* * * * *